United States Patent [19]

Selby, III et al.

[11] Patent Number: 4,677,604

[45] Date of Patent: Jun. 30, 1987

[54] METHOD FOR CONTROLLING ACCESS TO RECORDED DATA

[75] Inventors: Howard W. Selby, III; Michael W. Fellinger, both of Boulder, Colo.

[73] Assignee: Selsys Corporation, Boulder, Colo.

[21] Appl. No.: 698,109

[22] Filed: Feb. 4, 1985

[51] Int. Cl.$^4$ .............................................. G11B 7/00
[52] U.S. Cl. ........................................ 369/33; 369/47; 369/52; 360/72.1; 358/342; 235/462; 434/315
[58] Field of Search ............... 235/419, 462, 472, 495; 358/342; 369/32, 33, 47, 52, 50; 434/307, 310, 314, 315; 360/72.1

[56] References Cited

U.S. PATENT DOCUMENTS

| 4,437,127 | 3/1984 | Hirose | 364/419 X |
| 4,481,412 | 11/1984 | Fields | 235/385 X |
| 4,506,342 | 3/1985 | Yamamoto | 360/72.2 X |

Primary Examiner—Robert L. Richardson
Attorney, Agent, or Firm—Woodcock Washburn Kurtz Mackiewicz & Norris

[57] ABSTRACT

Access to a complete data base stored on optical disk media is limited to portions of the data base to which individual users are entitled by provision of an additional code on the optical disk, indicating the portions of the data base which the customers may access. The disk reader comprises an additional reader for reading the additional code and means for preventing access to other portions of the data base. The additional code may be conventional bar code.

28 Claims, 1 Drawing Figure

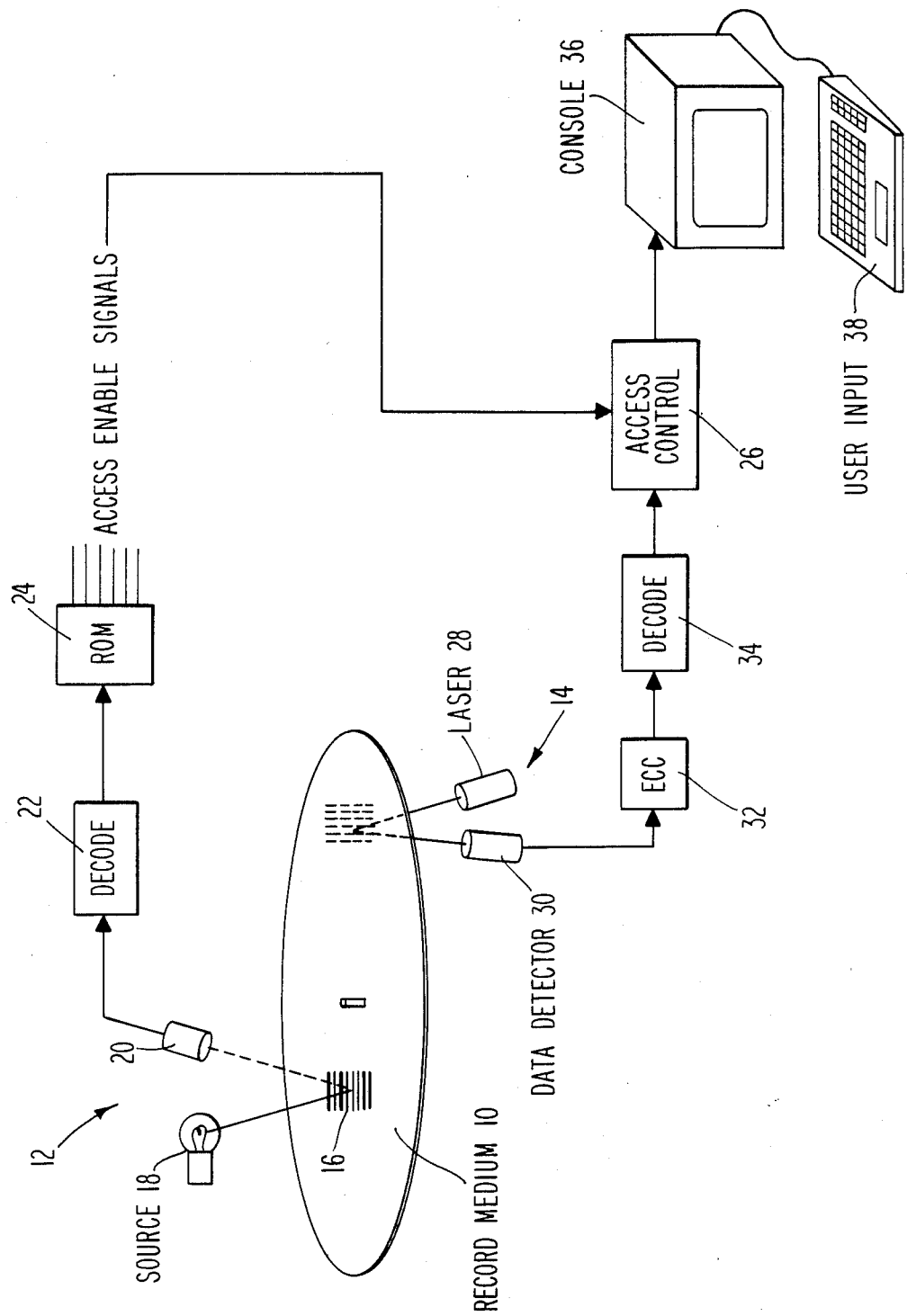

METHOD FOR CONTROLLING ACCESS TO RECORDED DATA

FIELD OF THE INVENTION

This invention relates to methods of providing customers with a copy of a complete data base but preventing their access to portions of the data base other than those for which they have paid the proper license fee.

BACKGROUND AND OBJECTS OF THE INVENTION

Recent developments in data storage, most particularly development of optical disks, have led to new problems with respect to marketing methods for data bases stored thereon. It is now feasible to encode enormous amounts of data onto a single optical disk and provide a reasonably economical laser disk reader for accessing the data. For example, it is now possible to reproduce all of the information concerning all of the airports of the world into a single disk. This information includes essentially all physical data required for navigation of airplanes including such things as the locations and frequencies of radio beacons, their bearings from other beacons, physical descriptions of airports, including sufficient information to enable a video picture of the approach to the airport to be displayed to a pilot, together with depiction of landmarks, mountains, rivers, towers, buildings, roads, railway lines, and all other relevant information. As mentioned, all this information can now be stored on a single optical disk, and it is or will shortly be within the skill of the art to provide a disk reader with display sufficiently compact to fit into the cockpit of an airplane. In this way, the pilot may be provided with all the information requied for navigation, including a video "picture" of the air port at which he is to land, right in the cockpit of his airplane. However, preparation of this massive data base for storage on an optical disk is a major task. Similarly, creation of the disk itself is quite complicated, involving as it does the creation of "masters", intermediate stages in the finishing of the disks, as well as their production, storage, and distribution. For this reason, manufacturers would prefer that as few different disks as possible be manufactured, so that the costs of production of the disks could be amortized over as large a customer base as possible.

It will be appreciated, however, that some pilots only fly in certain areas, for example, New England, while other fly nationwide, and still other worldwide. Provision of a single version of a disk with all the data on it would necessitate that New England pilots would have to purchase a data base containing data on foreign countries, as well as on the remainder of the United States. Ordinarily this would mean that all pilots would pay the same price for the data base. However, it would seem inequitable to require pilots requiring access to only a small portion of the data base to pay the same as pilots desiring access to larger portions or all of the data base; and of course the pilots would prefer to only purchase that portion of the data base which they might use.

In order that a single version of the disk can be manufactured, containing the complete data base, but wherein the price paid for the disk can be determined in accordance with the portion of the data actually needed by the user, some means for prevention of access of the user to other portions of the data base should be provided, and this is an object of this invention.

It is a further object of the invention to provide an optical disk reader for reading data from an optical disk, comprising means for control of the access of the user to predetermined portions of the data base, such that the manufacturer of the disk has control over the access of users to specific areas of the disk, and in which neither the disk reader apparatus, the disk itself, nor their manufacture is unduly complicated by the provision of the limited access feature.

SUMMARY OF THE INVENTION

The above needs of the art and objects of the invention are met by the present invention which comprises an optical disk reader comprising a second reader adapted to read an encoded symbol indicating the portions of the disk to which the user is entitled to have access. Typically, this additional encoded symbol can be a bar coded label attached to a portion of the disk which is not used for storage of the data base information. A simple bar code reader can then be incorporated into the optical disk drive, and used to provide an access code signal to means for limiting access to the data base, included in the main data reading circuitry of the optical disk drive.

BRIEF DESCRIPTION OF THE DRAWING

The single FIGURE is a block diagram outline of a system providing limited access to a data base in accordance with the invention.

DESCRIPTION OF THE PREFERRED EMBODIMENTS

As mentioned above, the present invention is designed to solve the problem of providing a complete copy of a given data base to users who in effect pay a license fee for only a portion of the data base, while giving them access only to that portion, by providing means for insuring that the customers do not have access to the portions of the data base for which they have not paid. The sole figure of this application shows an apparatus for achieving these goals. The invention also provides a way of limiting access to portions of a data base for other purposes, such as data security. For example, various individuals within a company have various uses for data concerning the company's operations. According to the invention, all users can be provided with the complete data base, but access to sensitive portions can be limited to those who "need to know" according to the invention.

A record medium 10 is shown being accessed on opposite sides by an access code detection device 12 discussed in detail below, and a data access device 14, also to be discussed in detail. In the preferred embodiment, the access code is encoded on a bar coded label 16 which may be attached to one surface of the disk 10 at its point of manufacture in accordance with the customer's order. Other code types, such as optically readable characters or various magnetic recording devices, are the equivalent of the bar code. The access code on the label indicates those portions of the disk to which the user is entitled to have access. Thus the label "customizes" a universal disk containing a complete data base to one which in effect only contains the portions of the data base needed by the user. For example, it is now economically feasible to encode all worldwide data relevant to airplane flight, such as airport locations, location and frequency of radio direction beacons, indication of weather station information, pictorial representations of the approach paths of various airports and the like on a single laser disk of conventional type. It will be appreciated that pilots who only fly, for example, east of the Mississippi River will only be interested indata for that area, and would naturally be unwilling to pay the same price for a copy of the entire data base as did a pilot who flew worldwide; this would oblige such a pilot to buy a lot of useless data. However, the cost or production of such optical disks is so high that it would be prohibitive to manufacture different disks for the innumerable different users. Therefore, according to the invention, one sells the pilot who stays east of the Mississippi a complete disk, but charges him only for the relevant portion of the data, and only allows him access to the portion for which he has paid.

According to the invention, therefore, disks 10 comprising the entire data base are manufactured. Labels 16 indicating those portions of the disk to which each individual user is to have access may be added upon receipt of order, or disks with various limiting labels may be inventoried. Dealers might similarly be supplied with disks and selected labels. Typically the label will be on the upper surface of the disk, away from the data, which is typically encoded on the lower side of the laser disk. A light source 18 illuminates the code which is read by a conventional detector 20. As mentioned, bar codes are one possibility; magnetic stripe coding as on credit cards is another; optically readable characters are a third. Suitable units for reading these and other code types are available from a number of sources. The output of the detector is decoded at 22 and converted into conventional binary symbols which are then used to access a read only memory (ROM) 24 which outpus access enable signals, indicating those portions of the disk to which the user is entitled access. The access enable signals are used by access controller 26. Access controller 26 is included in the data path between laser 28 and detector 30, which together read the data from the disk, error detection and correction circuitry 32 (if used), and decoder 34 which converts the encoded data stored on disk 10 to usable signals. Access to these signals is controlled by the access controller 26 in accordance with the access enable signals, thus allowing only the correct data to be supplied to the user's computer or other display device 36, 38. Thus, the user will be precluded from accessing data to which he is not entitled according to the code on the bar code label 16.

While the drawing shows discrete components for decoder 22 and access controller 26, in a presently preferred embodiment these functions are performed by a microprocessor which controls the optical drive. However, the showing according to the figure may be somewhat mor clear. Similarly, the access enable signals, indicated as being stored on ROM 24, may in fact be written on the disk; these signals would then be read first, upon power-up of the drive, and used in conjunction with the signals from the label 16, to control access to the various portions of the disk.

In the connection, note that the signals written to the ROM or to the disk effectively subdivide the data base. In the airplane pilot case, this permanently written data would be divided into a dozen or more relevant geographic regions. The encoded label would then "customize" the data base by indicating those of the regions to which the user was entitled to have access. In the company data base example, the data would be divided according to subject matter, e.g. "Executive Personnel", "Hourly Personnel", "10-K Filings", "Secured Debt", "Accounts Receivable", "Model 2900 Technical Specification Version 2", and the like. Each of these categories might be provided with an access code; each user's individual label would indicate the codes of the files (or classes of files) to which he was entitled to have access. The label code could further limit access to recalling the data only, or might permit alteration by the particular user.

Another possible use of the label 16 is in providing specific information concerning the user. For example, again discussing the airplane pilot case, a pilot when he ordered a copy of the disk with a bar code label to allow him to access the navigational data from a particular part of the world, might also indicate the type of airplane he flew, as well as any personal flight plan preferences. This information could then be used in conjunction with remote telecommunications devices to supply him with additional information concerning the navigation of the plane. For example, there are now available commercial weather services which for a fee provide pilots individualized weather reports concerning a flight path between selected airports. This service can be further tailored to the individual using information concerning his aircraaft, for example, its cruising speed and altitude, and with the pilot's preferences, e.g., that he prefers to fly at low altitudes where possible. By storing this information concerning the pilot and his aircraft on the label it could be automatically transmitted to the weather service which could then provide a unique weather report, including updates on any failed nvaigational beacons or the like, especially tailored to that particular pilot's needs and preferences. This would also provide a convenient method of seeing that the pilot is correctly billed for this service. The equipment for providing such a radio transmission and for receiving the customized weather report can easily be integrated with the controller for the optical disk discussed above.

While a preferred embodiment of the invention has been disclosed, it should be appreciated that numerous modifications and variations thereon are possible without departure from its spirit and scope, which is therefore not to be limited by the above exemplary disclosure but only by the following claims. In particular, the same reader could be used to read both the data from the data base itself and the encoded representations of the portions of the data base to which the users are permitted access.

I claim:

1. A visual display system for aiding pilots comprising:
   a data storage medium encoded with a data base indicative of a multiplicity of flight related visual displays;
   a code provided on a separate medium applied to a surface of said data storage medium, the code identifying a subset of said data base to which user access is to be restricted;
   reading means for reading said code and said data base from said record storage medium;
   display means for reading said code and said data base from said record storage medium;
   display means generating visula displays; and
   access controller means operatively disposed between said reading means and said display means and responsive to said code for restricting said visual displays to ones identified by said code.

2. The visual display system of claim 1 further comprising:
operator means coupled with said access controller means for identifying individual visual displays of said subset to display on said display means.

3. The visual display system of claim 1 wherein said code identified flight related visual displays for airports in a predetermined geographic region.

4. A method for generating visual displays to aid pilots comprising the steps of:
encoding a data storage medium with a data base representing a multiplicity of flight related visual displays;
providing a machine readable code on a medium separate from the storage medium, the code identifying a portion of the data base to which access is to be restricted;
applying the separate medium to a surface of the data storage medium;
reading said code from said separate medium; and
limiting user access to only said portion of the data base identified by the code.

5. The method of claim 4 further comprising the steps of:
manually identifying one of said plurality of flight related visual displays; and
generating said one visual display in response to said manual identifying step.

6. The method of claim 4 further comprising the step of:
identifying said portion of the data base to which user access is to be restricted.

7. An article of manufacture comprising:
a record storage medium encoded with a data base indicative of a multiplicity of flight related visual displays; and
a machine readable code disposed on a separate medium applied to a surface of said record storage medium, the code identifying a portion of the data base to which user access is to be restricted.

8. The article of manufacture of claim 7 wherein said code identifies a subset of the flight related visual displays further related to one another by geography.

9. In a machine readable storage medium having a plurality of data sets stored thereon, a method of restricting access to predetermined ones of the data sets comprising the steps of:
(a) providing, on a medium separate from the storage medium, a machine readable code identifying the predetermined ones of the data sets to which access is to be restricted;
(b) applying the separate medium to a surface of the storage medium;
(c) reading the code;
(d) determining the predetermined ones of the data sets to which access is to be restricted based upon the code; and
(e) restricting access to the predetermined ones of the data sets identified by the code; whereby the storage medium may be customized according to the particular requirements of a user.

10. Method according to claim 9 wherein the separate medium is a label.

11. Method according to claim 1 wherein the code is a bar code printed on the label.

12. Method according to claim 9 further comprising the step of assigning a selling price to the storage medium according to the ones of the data sets identified by the code.

13. In a machine readable storage medium having a data base comprised of a plurality of data sets, a method of customizing the storage medium according to the requirements of a user comprising the step of:
applying a separate medium containing a machine readable code to a surface of the storage medium, the code identifying predetermined ones of the plurality of data sets to which access is to be restricted.

14. Method according to claim 13 further comprising the step of assigning a selling price to the storage medium according to the ones of the data sets identified by the code.

15. Method of restricting access to ones of data sets stored on a machine readable storage medium comprising the steps of:
(a) reading a code provided on a separate medium applied to a surface of the storage medium, the code identifying the data sets to which access is to be restricted;
(b) determining the data sets to which access is to be restricted based upon the code; and
(c) restricting access to the ones of the data sets identified by the code.

16. Method according to claim 15 wherein the separate medium is a label and the code is a bar code.

17. Apparatus for restricting access to data stored on a machine readable storage medium comprising:
(a) a machine readable code provided on a separate medium applied to a surface of the storage medium, the code identifying at least one data subset to which access is to be restricted;
(b) first means for reading the code and providing a data output indicative thereof; and
(c) second means responsive to the data output provided by the first means for restricting access to the data stored on the storage medium to only the data subset identified by the code.

18. Apparatus according to claim 17 wherein the separate medium is a label.

19. Apparatus according to claim 18 wherein the storage medium is an optical disk having data stored on a first surface thereof and the label is applied to a second surface thereof.

20. Apparatus according to claim 19 further comprising third means, separate from the first means, for reading data from the optical disk.

21. Apparatus according to claim 20 wherein the third means comprises laser means.

22. Apparatus according to claim 18 wherein the code is a bar code.

23. A machine readable storage medium having stored thereon a data base comprising a plurality of data sets, further comprising a machine readable code provided on a separate medium applied to a surface of the storage medium for identifying predetermined ones of the plurality of data sets to which access is to be restricted.

24. Storage medium according to claim 23 wherien the separate medium is a label.

25. Storage medium according to claim 24 wherein the code is a bar code.

26. Storage medium according to claim 25 wherein the storage medium is an optical disk having the plurality of data sets stored on a first surface thereof and the label is applied to a second, opposite surface thereof.

27. Apparatus for restricting access to data stored on an optical disk comprising:
(a) first means for reading a bar code contained on a label applied to a first surface of the disk and providing a data output indicative thereof, the code identifying at least one data subset to which access is to be restricted;
(b) second means, separate from the first means, for reading data from a second surface of the disk; and
(c) third means, responsive to the data output provided by the first means, for restricting access to the data subset identified by the code.

28. Apparatus according to claim 27 wherein the first means comprises an optical bar code reader, the second means comprises a laser and the third means comprises a microprocessor.

* * * * *